United States Patent
Schetelig et al.

(10) Patent No.: US 7,120,206 B2
(45) Date of Patent: Oct. 10, 2006

(54) SIGNAL DC OFFSET CORRECTION METHOD AND DEVICE

(75) Inventors: Markus Schetelig, Waltrop (DE); Paul Burgess, Bochum (DE)

(73) Assignee: Nokia Corporation, Espoo (FI)

( * ) Notice: Subject to any disclaimer, the term of this patent is extended or adjusted under 35 U.S.C. 154(b) by 814 days.

(21) Appl. No.: 10/024,720

(22) Filed: Dec. 21, 2001

(65) Prior Publication Data

US 2003/0002599 A1    Jan. 2, 2003

(30) Foreign Application Priority Data

Jun. 28, 2001    (EP) .................................. 01115809

(51) Int. Cl.
H04L 25/06    (2006.01)
H03L 5/00    (2006.01)
H04B 1/69    (2006.01)

(52) U.S. Cl. ................... 375/319; 375/130; 327/307

(58) Field of Classification Search ................. 375/346
See application file for complete search history.

(56) References Cited

U.S. PATENT DOCUMENTS

| 4,385,328 | A | | 5/1983 | Tanaka .................... 360/46 |
| 4,459,699 | A | * | 7/1984 | Monticelli et al. .......... 375/318 |
| 5,995,819 | A | * | 11/1999 | Yamaji et al. .............. 455/326 |
| 6,148,047 | A | * | 11/2000 | Mohindra .................. 375/346 |
| 6,208,696 | B1 | | 3/2001 | Giles ........................ 375/272 |
| 6,356,218 | B1 | * | 3/2002 | Brown et al. ............... 341/120 |
| 6,366,622 | B1 | * | 4/2002 | Brown et al. ............... 375/322 |
| 6,504,884 | B1 | * | 1/2003 | Zvonar ...................... 375/346 |
| 6,678,178 | B1 | * | 1/2004 | Lipcsei ...................... 363/98 |

FOREIGN PATENT DOCUMENTS

WO    0011831    3/2000
WO    0139382    5/2001

OTHER PUBLICATIONS

Analog Wide Band Audio Phase Shift Networks. Peter C. McNulty, WA1SOV□□http://home.att.net/~wa1sov/technical/allpass/allpass.html.*

* cited by examiner

*Primary Examiner*—Temesghen Ghebretinsae
*Assistant Examiner*—Juan Alberto Torres
(74) *Attorney, Agent, or Firm*—Banner & Witcoff, Ltd.

(57) ABSTRACT

A method and a device for estimating the DC offset portion of a signal, especially of a signal containing parts with sinusoidal shape, for example a signal which results from demodulation of a frequency modulated receive signal. A method is presented for correcting the direct current offset portion (DC offset) of a first signal which includes phase shifting the first signal for obtaining a second signal and comparing the first signal and the second signal with an estimated DC offset. The estimated DC offset is adjusted if the result of the comparison is that the first signal and the second signal are on different sides of the estimated DC offset and the estimated DC offset remains constant as long as the result of the comparison is that the first signal and the second signal are on the same side of the estimated DC offset.

15 Claims, 3 Drawing Sheets

SIGNAL DC OFFSET CORRECTION METHOD AND DEVICE

BACKGROUND OF THE INVENTION

The invention relates to a method and a device for estimating the DC offset portion of a signal, especially of a signal containing parts with a sinusoidal shape, for example a signal which results from demodulation of a frequency modulated receive signal. After demodulation of a frequency modulated signal, the problem of carrier frequency estimation transforms into Direct Current (DC) estimation of the received signal. For simplicity only the abbreviated term DC estimation will be used in the present specification. The term tracking is used if the DC value is continuously estimated not only during the beginning of a packet but also for the remaining portion of a packet. In particular the present invention relates to a device for correcting the DC offset of a signal, for example a received radio frequency signal after demodulation.

The present invention is especially designed for systems where fast and reliable DC estimation is difficult due to the nature of the received signal, especially for received data packets in TDMA (Time division Multiple Access) and CDMA (Code Division Multiple Access) systems.

In some known systems of this kind (e.g. DECT, Digital European Cordless Telephone Standard), the DC estimation is not a problem due to a long sequence of equally distributed bits (1010101 . . . series) at the start of each data packet. The preamble is DC free and can be used for DC estimation. After the start of the packet is indicated by some control logic, the estimated DC is usually frozen and used for the rest of the packet. In the mentioned DECT standard, the preamble is long enough to apply linear methods of DC estimation, e.g. simple low pass filtering of the incoming signal by means of a R-C combination can be applied.

For systems having a shorter preamble, the DC estimation has to be faster which usually results in a lower accuracy of the estimated DC. One possibility to overcome the problem of the low accuracy of an initial estimate is not to freeze the rough DC estimate but to perform continuous tracking during the whole data packet. One difficulty with those DC tracking algorithms are sequences of equal bits that result in a signal that is basically constant. In such a case the estimated DC must not slowly drift to this constant signal. One example of a system with a short preamble is the Bluetooth™ system described in the specification of the Bluetooth™ standard. Those skilled in the art will appreciate that other wireless systems also exist, and reference herein to Bluetooth™ is not intended to be limited thereto.

Bluetooth™ wireless technology allows users to make effortless, wireless and almost instant connections between various communication devices, such as mobile phones, computers, printers, etc. Bluetooth™ provides short-range wireless connectivity and supports both point to point and point to multipoint access. The Bluetooth™ standard provides a preamble of data packets with a preamble of four bits which can be used for DC-estimation.

Bluetooth™ operates in the 2.4 GHz ISM band using a band of 83.5 MHz which locates 79 RF channels spaced 1 MHz apart. The channel is represented by a pseudo-random hopping sequence through available channels. The channel is divided into time slots where each slot corresponds to an RF hop frequency. Consecutive hops correspond to different RF hopping frequencies. The nominal hop rate is 1600 hops per second. All Bluetooth™ devices of a given piconet are time and frequency hop synchronized to the channel.

The foregoing description makes it apparent to those skilled in the art that fast and reliable DC estimation methods are necessary for operating a communication device which operates in accordance with the Bluetooth™ standard.

SUMMARY OF THE INVENTION

According to a first aspect of the invention, a method for correcting the direct current offset portion (DC offset) of a first signal (Signal 1) is provided which comprises the following steps:

phase shifting the first signal (Signal 1) for obtaining a second signal (Signal 2)

comparing the first signal (Signal 1) and the second signal (Signal 2) with an estimated DC offset.

The estimated DC offset is adjusted if the result of the comparison is that the first signal (Signal 1) and the second signal (Signal 2) are on different sides i.e., higher and lower amplitudes, of said estimated DC offset, and the estimated DC offset is kept constant as long as the result of the comparison is that the first signal (Signal 1) and the second signal (Signal 2) are on the same side of the estimated DC offset.

In a refinement according to the first aspect to the invention, the phase shifted second signal (Signal 2) is obtained by low pass filtering said first signal (Signal 1).

The invention is, furthermore, very useful for DC estimation for signals originating from demodulation of a frequency modulated receive signals, e.g. GFSK (Gaussian Frequency Shift Keying).

According to a second aspect of the invention, there is provided a device for correcting the direct current offset portion (DC offset) of a signal (Signal 1), comprising: an input for connecting to a signal line for the signal (Signal 1); a phase shifting element (LPF 1) for producing a phase shifted signal (Signal 2); means (LPF2) for adjusting the estimated DC offset when Signal 2 is connected to its input and holding its output signal (=estimated DC offset) when Signal 2 is disconnected from its input; an output signal line connected to the output of said means for adjusting the estimated DC offset (LPF2); a decision circuit (DEC) for deciding whether Signal 1 and Signal 2 are on different or on the same sides of said estimated DC offset; a switch for connecting the phase shifted signal (Signal 2) to the means for adjusting the estimated DC offset (LPF 2) if the decision circuit decides that Signal 1 and Signal 2 are on different sides of the estimated DC offset and disconnecting the phase shifted signal (Signal 2) from the means for adjusting said estimated DC offset if the decision circuit decides that Signal 1 and Signal 2 are on the same side of the estimated DC offset.

Signal 1 and signal 2 being on the same side of the DC offset means that both signals are higher or lower than the estimated DC level at a time.

This way the DC estimation is performed by possibly alternating two different modes of operation. During one period, when Signal 1 and Signal 2 have amplitudes that are both on the same side of the estimated DC level, the estimated DC offset value is kept on a constant value. During another period, when Signal 1 and Signal 2 have amplitudes that are on different sides of the estimated DC level, the estimated DC offset value is increased or decreased until Signal 1 and Signal 2 are on the same side of the estimated DC offset value.

If the decision circuit decides that when Signal 1 and Signal 2 have amplitudes that are on different sides of the estimated DC level, the estimated DC offset is increased as long as Signal 2 is higher than Signal 1 and the estimated DC offset is decreased as long as Signal 2 is lower than Signal 1. This means that the estimated DC offset slowly adapts towards Signal 2 as long as Signal 1 and Signal 2 have amplitudes that are on different sides of the estimated DC offset.

In one possible refinement, the device according to the second aspect of the invention further comprises one XOR (exclusive-OR) gate and a first and a second comparator circuit with input signal lines X and input signal lines Y for comparing the input signals X and Y, whereby the input signal line X of the first comparator circuit is connected to the output of the first low pass filter LPF1 (Signal 2) and the input signal line X of the second comparator circuit is connected to the input signal (Signal 1) and both input signal lines Y of the first and second comparator circuits are connected to the output signal line of the second low pass filter. The output signal line of the second low pass filter corresponds to the estimated DC offset. The output line of an Exclusive-OR gate (XOR), that comprises two input signal lines, controls the switch, whereby the outputs of the first and second comparator circuits are connected to the input lines of said XOR gate. If the output line of the XOR gate is positive, the input line of the 2nd lowpass filter (LPF2) is connected to signal 2, otherwise the input line of the second low pass filter (LPF2) is disconnected.

This decision circuit provides a cheap and reliable circuit for deciding when the two stages according to the present invention are reached and switches between these stages correspondingly.

In one possible refinement according to the second aspect of the invention the phase shifting element is implemented by a low pass filter. Also the means for adjusting the estimated DC offset portion can be implemented by a low pass filter advantageously. The speed of adaptation hereby is determined by the time constant of this second low pass filter.

If the estimated DC offset is incorrect, i.e. it does not represent the correct DC offset value, the amount of charging and discharging are different and the estimated DC offset is adjusted automatically to the correct DC offset, wherein the correct DC offset is reached when the amount of charging and discharging become the same.

The invention might be implemented as an analog circuit or as hardwired digital logic. It might be implemented for example in the analog part of an RF receiver or implemented as hardwired digital logic in a baseband part following the RF receiver or in a digital part of the RF-receiver itself.

BRIEF DESCRIPTION OF THE DRAWINGS

For a better understanding of the present invention, and to understand how the same may be brought into effect, reference will now be made by way of example only to the following drawing illustrations, in which.

DETAILED DESCRIPTION OF THE INVENTION

Figure 1:
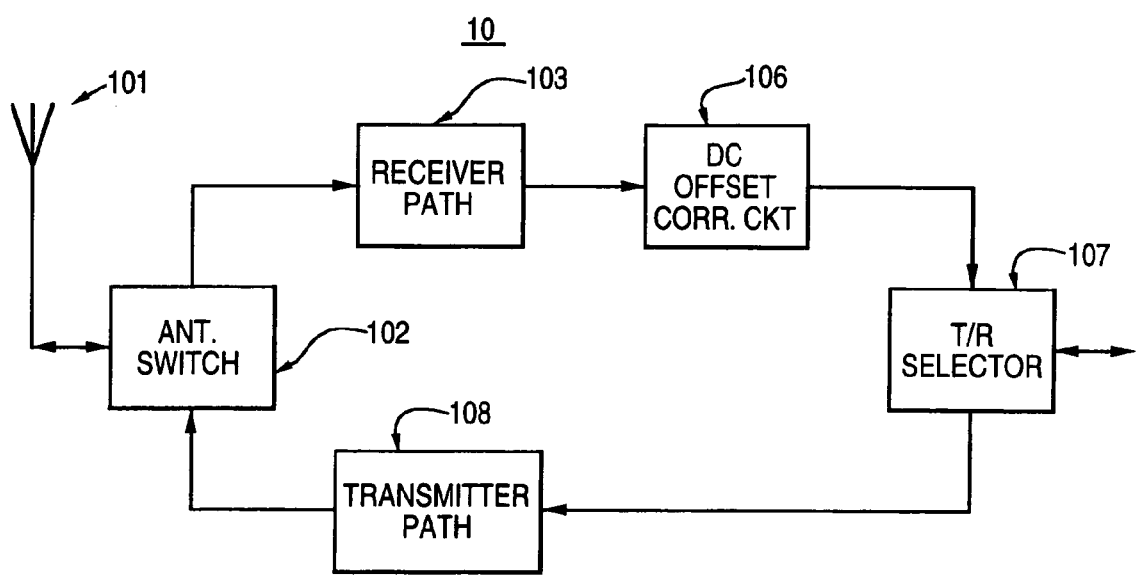
FIG. 1 shows a receiving/transmitting circuit (transceiver) of a communication device with a DC offset estimation circuit according to the invention.

FIG. 1 shows a transceiver of a communication device 10 with a DC correction circuit 106 according to the invention. The communication device 10 might be a transceiver module working in accordance with the Bluetooth standard. The transceiver has an antenna 101 for transmitting and receiving radio frequency signals. The antenna is connected to an antenna switch 102 which alternately connects the receiver path 103 or a transmitter path 108 of the transceiver to the antenna. The antenna switch 102 might be also implemented by duplex filters.

The transmitter path is only represented by block 108 in FIG. 1 because it can be built in any way a person skilled in the art might wish to implement it without taking care for the invention as described in this document.

The receiver path 103 of the device 10 comprises, for example, low noise amplification, down conversion, filtering at different stages of the receive path, mixing and demodulation. A person skilled in the art is aware that there are many ways for the implementation, therefor the receiver circuitry is not shown in detail here. The assumption for the described embodiment of this invention is the provision of the demodulated receive signal at the output of some processing stage which can be an RF front end of many types. It is of major importance that the DC level of the demodulated signal is set to the correct level by the DC offset correction circuit 106. If the DC level for instance was unprecisely estimated, the subsequent data detection circuitry might work erroneously.

Figure 2:
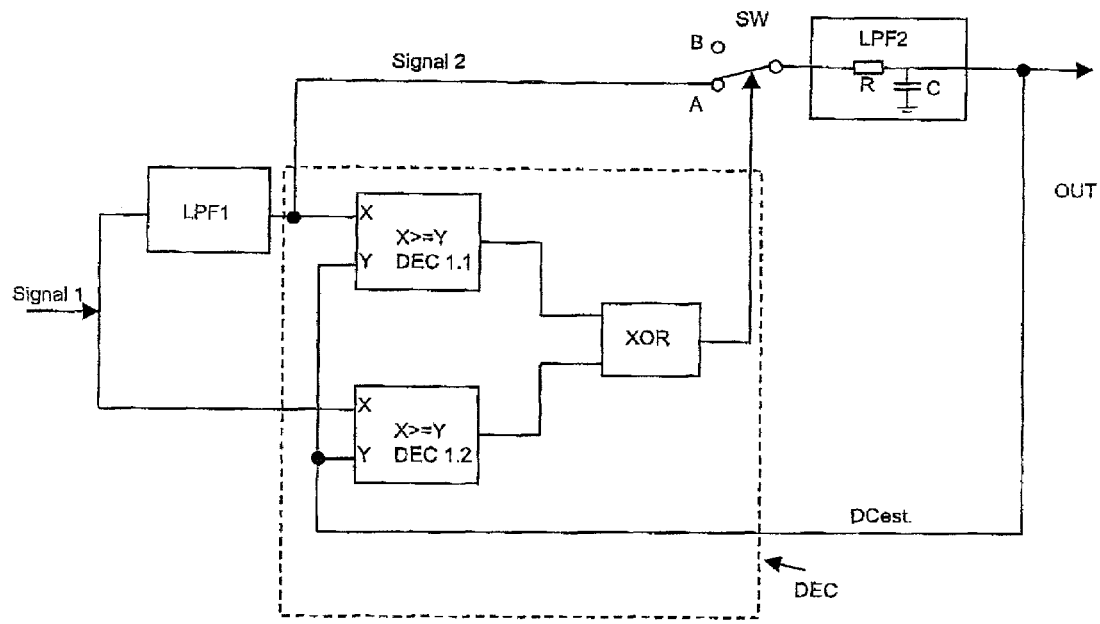
FIG. 2 shows a DC offset estimation circuit according to the invention at a first operational stage.
Figure 3:
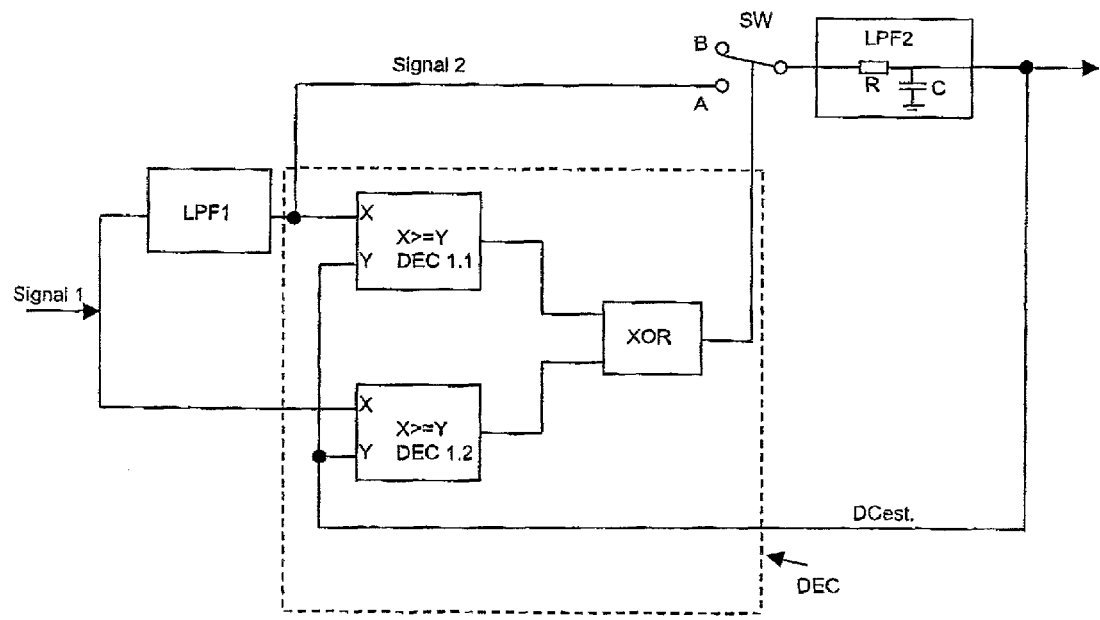
FIG. 3 shows a DC offset estimation circuit according to the invention at a second operational stage.

For the correction of the DC-Offset, a DC offset-estimation circuit 106 according to the invention may be used such as shown in FIG. 1. In the following description, the DC-offset estimation circuit is described in a way as it would be implemented in analog form. A person skilled in the art will appreciate that this kind of circuit can be implemented in a digital way by implementing the same functionality with hardwired digital logic components. It might also be useful to implement the Low-Pass filters, as described later in analog form and to implement the XOR gate and comparators in digital way of the communication device. Reference numeral 107 represents the transmit/receive selector. FIGS. 2 and 3 present a circuit for the estimation of the DC offset value 106 according to the invention in detail. The received and demodulated signal is represented by Signal 1. Signal 1 is split and fed to the X-input terminal of comparator DEC 1.2 on one side and is low pass filtered by filter LPF 1 on the other side. The output of low pass filter LPF 1, Signal 2, is a low pass filtered Signal 1. Basically this means, for the understanding of the invention, that Signal 2 is a phase shifted, attenuated version of Signal 1. In the prefered embodiment, the phase of signal 1 might be shifted between 45 to 60 degrees, but depending on the desired behaviour of the DC estimation circuit 106 the phase shift of the low pass filter LPF 1 might be chosen higher or lower. It can be desirable, depending on the implementation of the invention, to keep the attenuation of input Signal 1 as low as possible. On the other hand, also depending on the implementation of the invention and the desired behaviour of the DC offset correction circuit, an attenuation or amplification of signal 2 (during, after or before the phase shift) can result in a faster or slower adaptation of the DC offset correction.

Signal 2 is also split and fed to the X-input terminal of comparator DEC 1.1 on one side and to switch SW on the other side. The switch SW directs Signal 2 to the input of the low pass filter LPF 2 when the switch is in position A (FIG.

2). When the switch is in position B (FIG. 3), the input signal line of low pass filter LPF 2 is open. This means that the output signal OUT of the low pass filter is a further filtered variant of signal 2 when switch SW is in position A.

The signal OUT represents the estimated DC offset signal DCest in this circuit. When the switch is in position B, the output of the low pass filter LPF 2 is, generally, kept constant by means of capacitor C, which holds the voltage at the output terminal when the switch is changed from position A to position B. The output signal OUT, this means the estimated DC-offset, is supplied to the Y-input terminals of the comparator circuits DEC 1.1. and DEC 1.2. This way the comparator circuit DEC 1.2 compares the input signal Signal 1 with the estimated DC-offset and comparator circuit DEC 1.1 compares the low pass filtered input signal Signal 2 with the estimated DC-offset. The output terminals of the comparator circuits DEC 1.1 and DEC 1.2 are connected to the input terminals of an XOR gate. The XOR gate controls the switch SW. The comparator circuits DEC 1.1 and DEC 1.2 together with the XOR gate constitute the decision circuit DEC, which decides if Signal 1 and Signal 2 are on the same side of the estimated DC offset or are on different sides of the estimated DC offset.

As long as Signal 1 and Signal 2 are on the same side of the estimated DC offset, the switch SW is in position B and the estimated DC offset OUT is kept constant. As long as Signal 1 and Signal 2 are on different sides of the estimated DC offset, the DC offset signal is adjusted.

Figure 4:
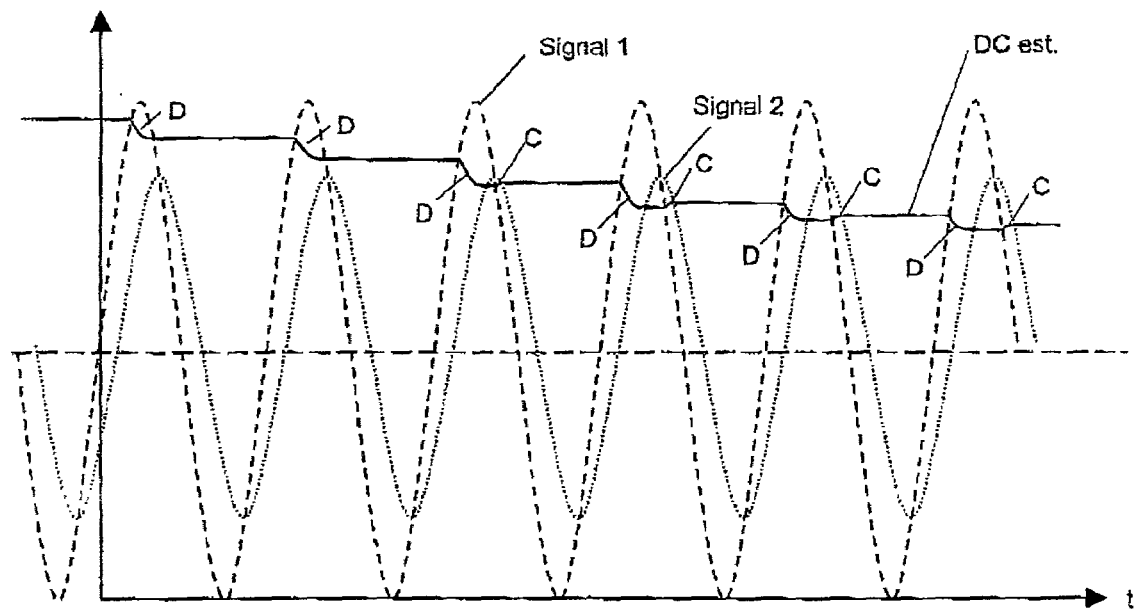
FIG. 4 shows a timing diagram in which the DC offset is under adaptation to a desired value.
Figure 5:
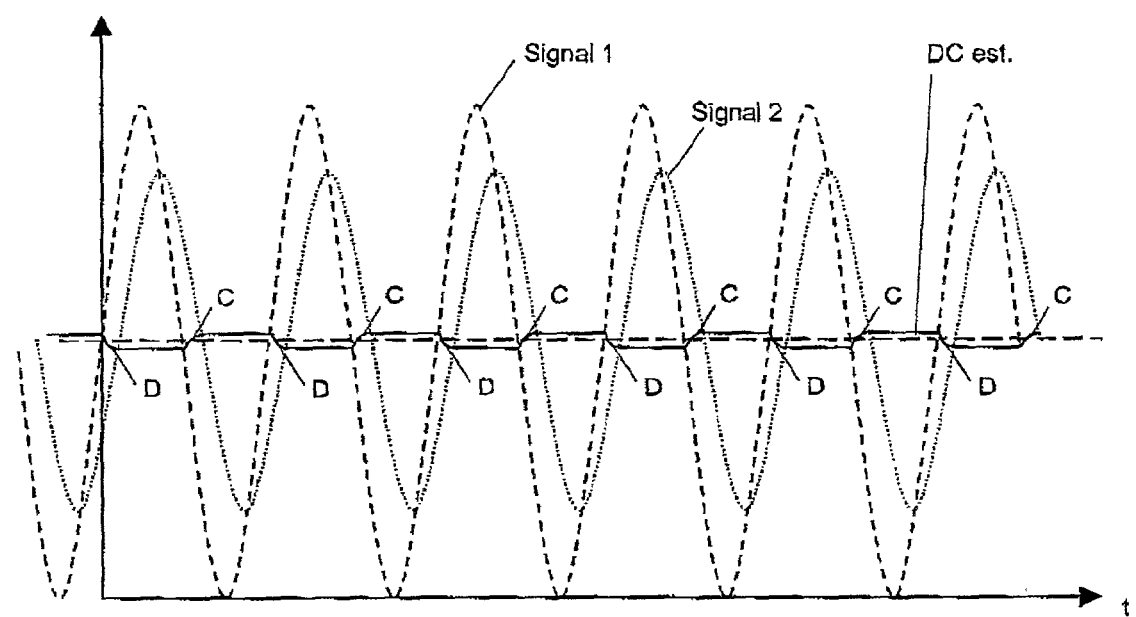
FIG. 5 shows a timing diagram in which the estimated DC offset is tracked according to the invention.

FIGS. 4 and 5 show timing diagrams for a demodulated GFSK input signal (Signal 1,dashed line), the phase shifted input signal (Signal 2;dotted line), the estimated DC offset (solid line) and the correct DC offset (long dashed line). They demonstrate how the adjustment of the estimated DC offset works in practice. The amplitude of Signal 2 is slightly lower than the amplitude of Signal 1 because it is attenuated during phase shifting.

In FIG. 4 the estimated DC offset (solid line; DCest) is under adjustment to the correct DC offset value. As long as the values of Signal 1 and Signal 2 are both above or below the estimated DC offset, the estimated DC offset is kept constant. As long as Signal 1 is higher then the estimated DC offset and Signal 2 is lower then the estimated offset, the estimated DC offset is discharged (decreased, D). As long as Signal 1 is lower than the estimated DC offset and Signal 2 is higher than the estimated DC offset, the estimated offset is charged (increased,C).

In FIG. 4 the estimated DC offset is higher than the correct DC offset and the amount of discharging (D) is higher than the amount of charging (C). This way the estimated DC offset is adjusted to the correct DC-offset step by step. If the estimated offset would be lower than the correct DC offset, the estimated offset would be adjusted to the correct DC offset in analog way by longer periods of charging and shorter periods of discharging.

FIG. 5 shows the status, when the estimated DC offset has reached the correct value. The signals Signal 1 and Signal 2 are still compared to the estimated DC offset and when they are both on the same side of the estimated DC offset the estimated DC offset is kept constant. As long as the signals Signal 1 and Signal 2 are on different sides of the estimated DC offset, charging (C) or discharging (D) takes place. The estimated DC offset oscillates very near to the correct DC offset this way. The differences between the estimated and correct offset can be neglected and the estimated DC offset value can be used for correct symbol decision.

The present invention is a very effective way for quickly adjusting the estimated DC offset to a correct value and, furthermore, for tracking the estimated DC offset when the correct level is reached.

The approach presented by this invention is, furthermore, insensitive towards sequences of equal symbols which cause the estimated DC offset to enter the hold status, i.e. no adaptation takes place for a sequence of equal bits that results in a constant estimated DC offset signal. The adjustment does not take place for sequences of equal symbols because Signal 1 and Signal 2 remain on the same side of the estimated DC offset and the estimated offset remains in the hold status for this period of time. Furthermore, the proposed solution is independent of the size of the signal swing that can considerably vary with practical implementations of FM demodulators.

A prerequisite of the applicability of this DC offset estimation is just a rough priori setting of the estimated DC offset in a way that the estimated DC offset is already set between the maximum values that are reached by Signal 1.

The present invention includes any novel feature or combination of features disclosed herein either explicitly or any generalization thereof irrespective of whether or not it relates to the claimed invention or mitigates any or all of the problems addressed.

In view of the foregoing description, it will be evident to a person skilled in the art that various modifications may be made within the scope of the invention.

The invention claimed is:

1. A method for correcting the direct current offset portion (DC offset) of a first signal comprising the steps of:
   phase shifting said first signal for obtaining a second signal,
   comparing said first signal and said second signal with an estimated DC offset,
   adjusting the estimated DC offset when the first signal and the second signal are found to be on different amplitude sides of said estimated DC offset, wherein the estimated DC offset is increased when the second signal is higher than the estimated DC offset and is decreased when the second signal is lower than the estimated DC offset.

2. A method according to claim 1, wherein said estimated DC offset is adjusted when the result of the comparison is that said first signal and said second signal are on different amplitude sides of said estimated DC offset.

3. A method according to claim 1, wherein said estimated DC offset is kept constant when the result of the comparison is that said first signal and said second signal are both higher than or are both lower than estimated DC offset.

4. A method according to claim 1, wherein said phase shifted second signal is obtained by low pass filtering said first signal.

5. A method according to claim 1, wherein the method is used for correcting the DC offset portion of a received and demodulated radio frequency signal.

6. A method according to claim 5, wherein said demodulation is a demodulation for GFSK modulated signals.

7. A device for correcting the direct current offset portion (DC offset) of a first signal comprising:
   an input for connecting to a signal line for receiving said first signal,
   a phase shifting element connected to the input for producing a phase shifted second signal,
   means for providing an estimated DC offset, wherein said estimated DC offset is adjusted when said phase shifted second signal is connected to an input of said means and said estimated DC offset is held constant when said phase shifted second signal is disconnected from the input of said means, an output signal line connected to the output of said means for providing said estimated DC offset, a decision circuit for deciding whether said first signal and said phase shifted second signal are on different or same amplitude sides of said estimated DC offset, and a switch for connecting said phase shifted second signal to the input of said means when said decision circuit decides that said first signal and said phase shifted second signal are on different amplitude sides of said estimated DC offset and disconnecting said phase shifted second signal from the input of said means when the decision circuit decides that said first signal and said phase shifted second signal are on the same side of said estimated DC offset.

8. A device according to claim 7, wherein said means for phase shifting said first signal is a low pass filter.

9. A device according to claim 7, wherein said means for providing said estimated DC-offset is a low pass filter.

10. A device according to claim 7, wherein said decision circuit comprises:

a first comparator circuit and a second comparator circuit each having an input signal line X and an input signal line Y and comparing input signals at the signal lines X and Y, the input signal line X of the first comparator circuit is connected to an output of said phase shifting element and the input signal line X of the second comparator circuit is connected to receive the first signal and the input signal lines Y of the first and second comparator circuits are, respectively, connected to the output signal line; and an Exclusive-OR (XOR) gate comprising two input signal lines, an output of said XOR gate controlling said switch and the outputs of the first and second comparator circuits are connected to the input lines of said XOR gate.

11. A radio frequency receiver comprising a device for correcting the DC offset according to claim 7 implemented as an analog circuit as part of said receiver.

12. An electronic device comprising a device for correcting the DC offset according to claim 7 implemented as a digital hardwired logic.

13. A device according to claim 7 for correcting the DC offset of a received and demodulated radio frequency signal.

14. A transceiver comprising a device for correcting the DC offset according to claim 7.

15. A communication device comprising a device for correcting the DC offset according to claim 7.

* * * * *